March 6, 1951

J. J. HARLEY
CABLE LASHING MACHINE 2,544,313

Filed Nov. 5, 1948

INVENTOR
J. J. HARLEY
BY
J. MacDonald
ATTORNEY

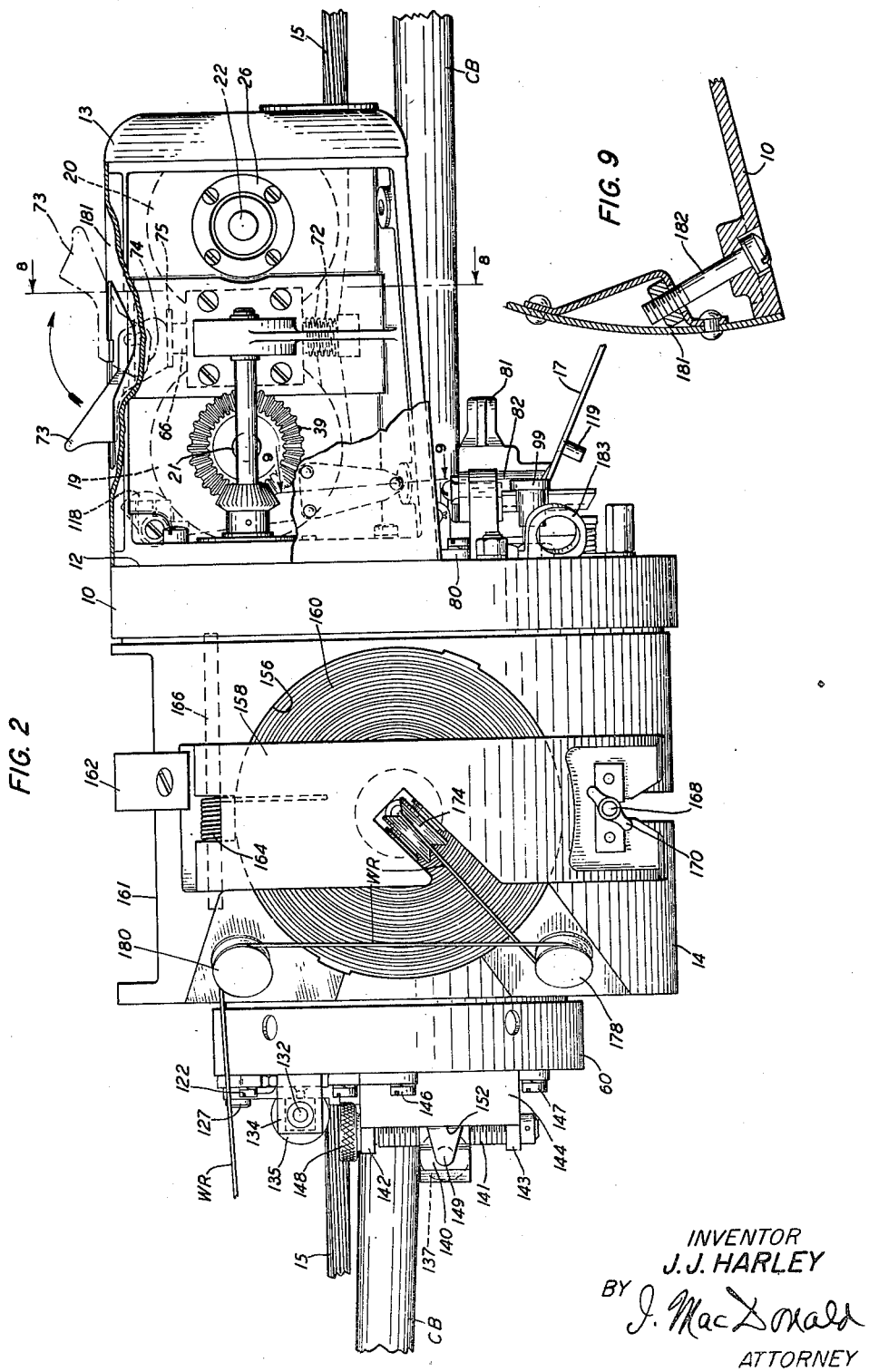

March 6, 1951
J. J. HARLEY
2,544,313
CABLE LASHING MACHINE
Filed Nov. 5, 1948
9 Sheets-Sheet 3
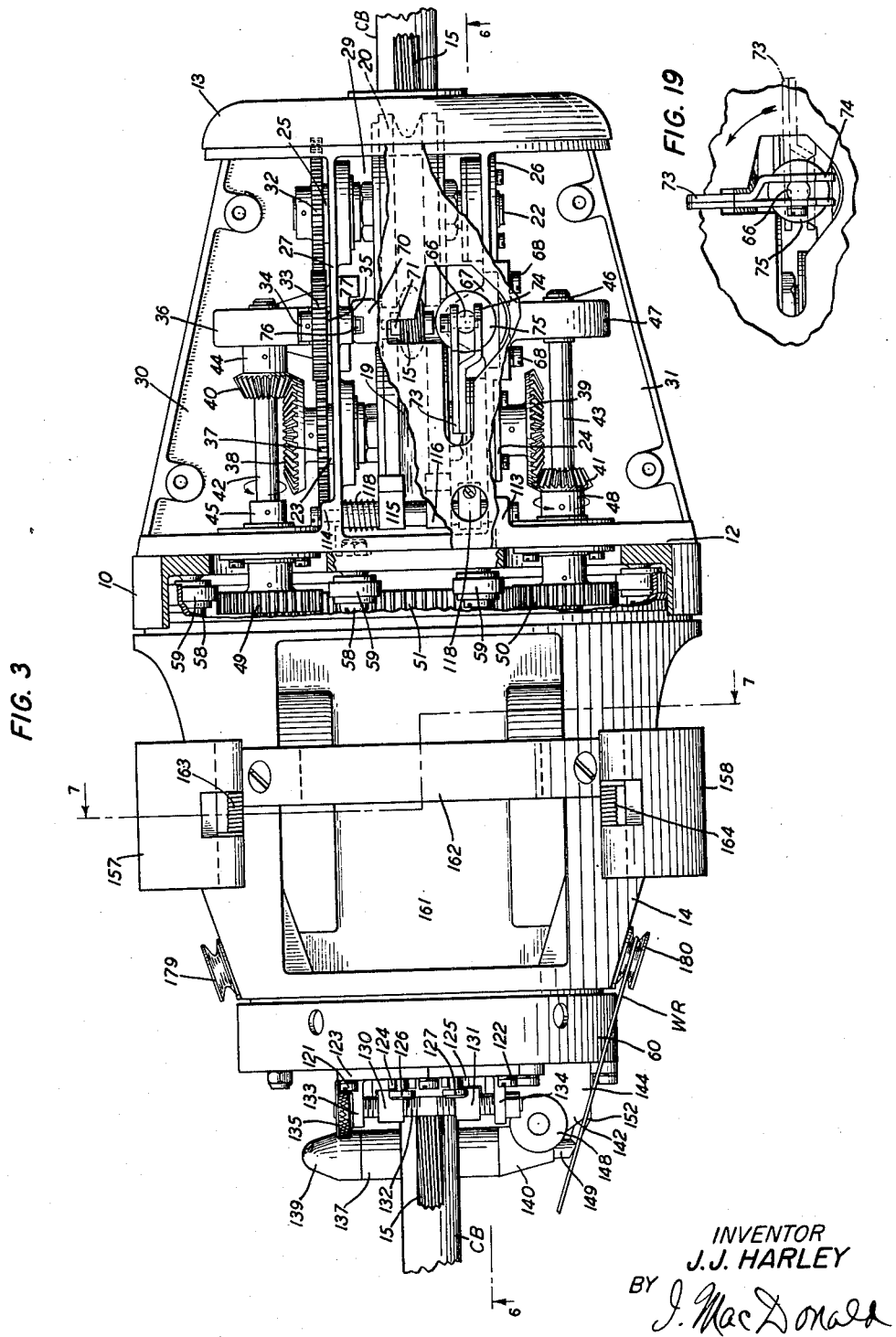
INVENTOR
J. J. HARLEY
BY J. MacDonald
ATTORNEY March 6, 1951  J. J. HARLEY  2,544,313
CABLE LASHING MACHINE
Filed Nov. 5, 1948  9 Sheets-Sheet 4
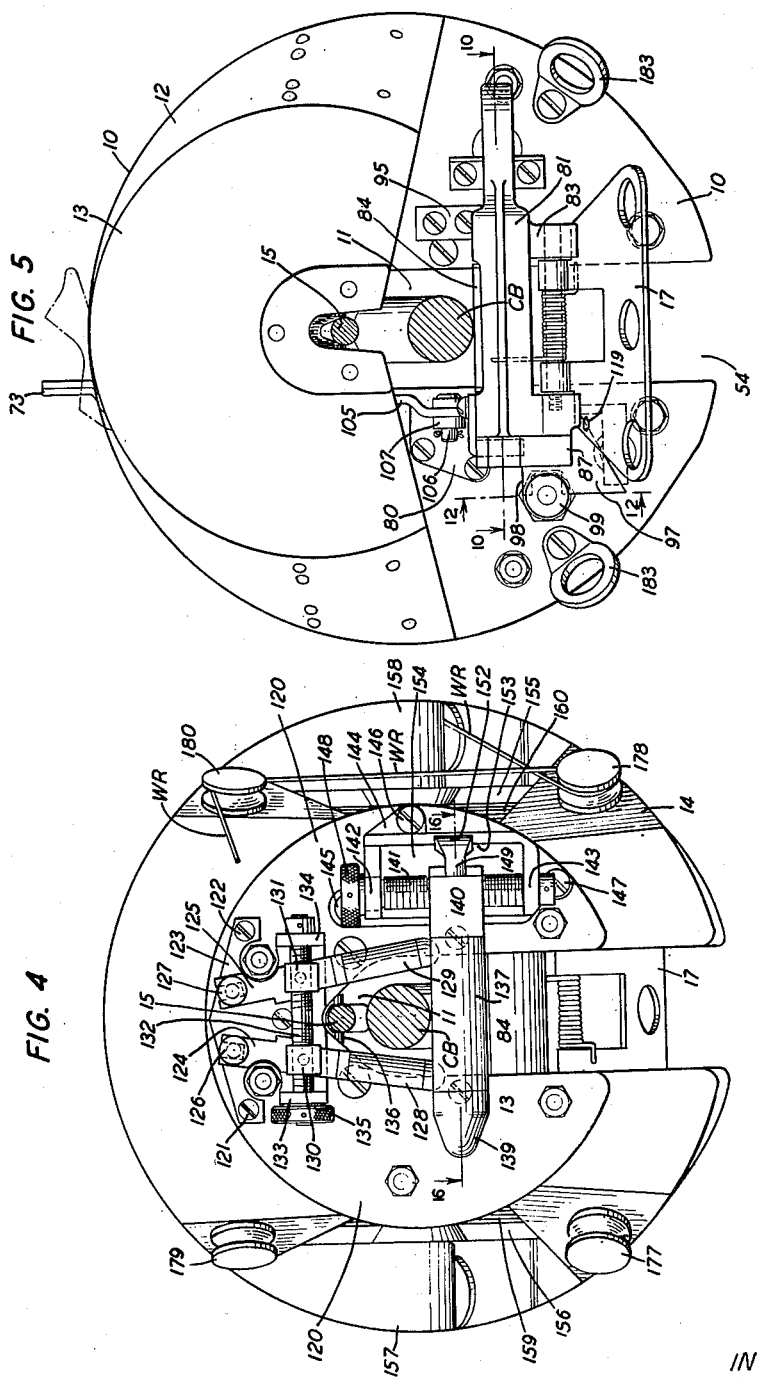
INVENTOR
J. J. HARLEY
BY J. MacDonald
ATTORNEY

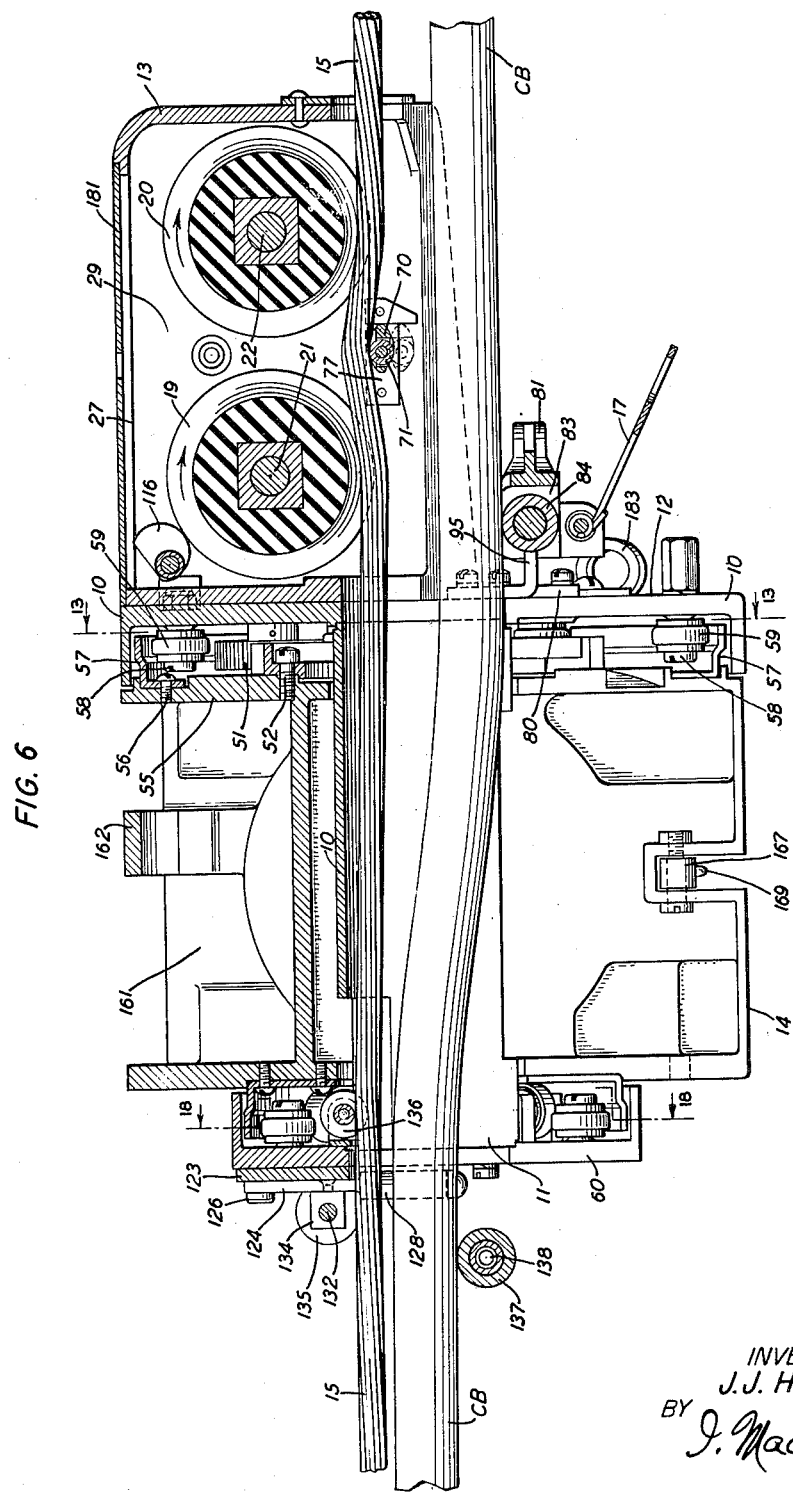

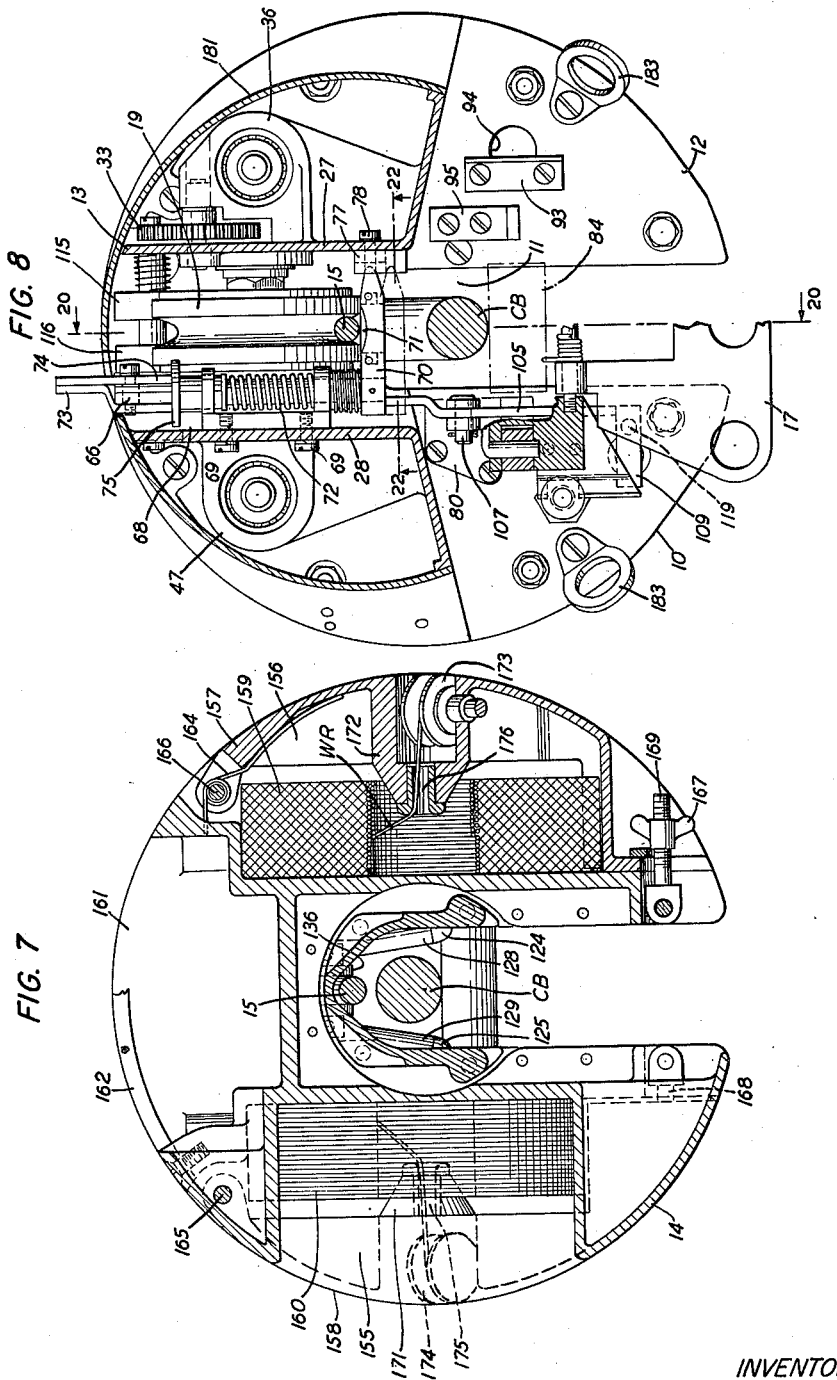

March 6, 1951 J. J. HARLEY 2,544,313
CABLE LASHING MACHINE
Filed Nov. 5, 1948 9 Sheets-Sheet 7
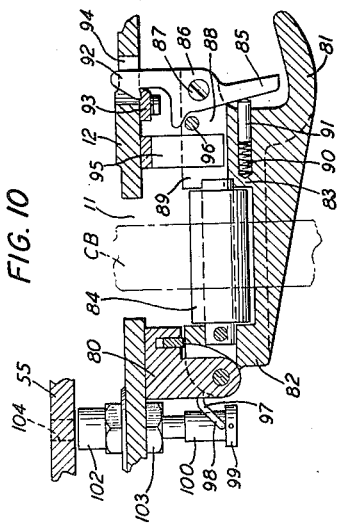
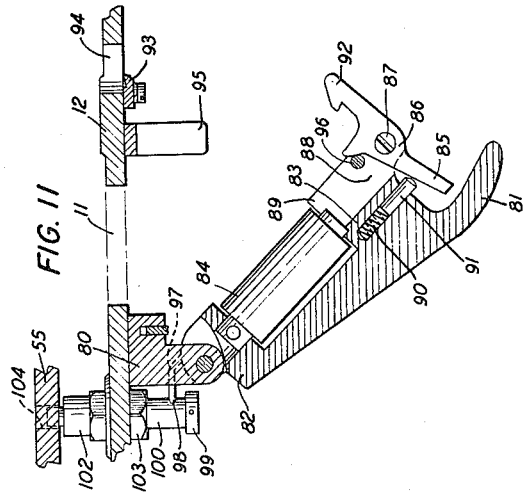
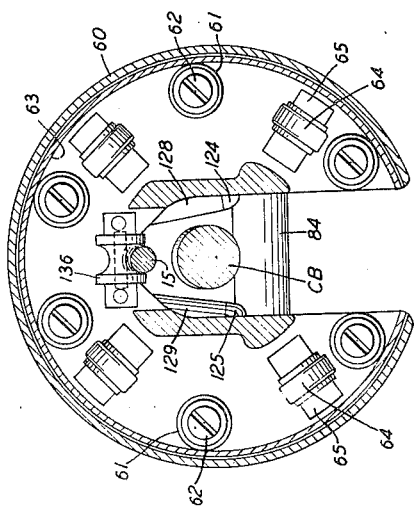
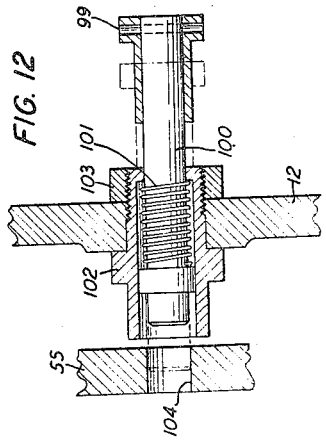
INVENTOR
J. J. HARLEY
BY J. MacDonald
ATTORNEY March 6, 1951     J. J. HARLEY     2,544,313
CABLE LASHING MACHINE
Filed Nov. 5, 1948
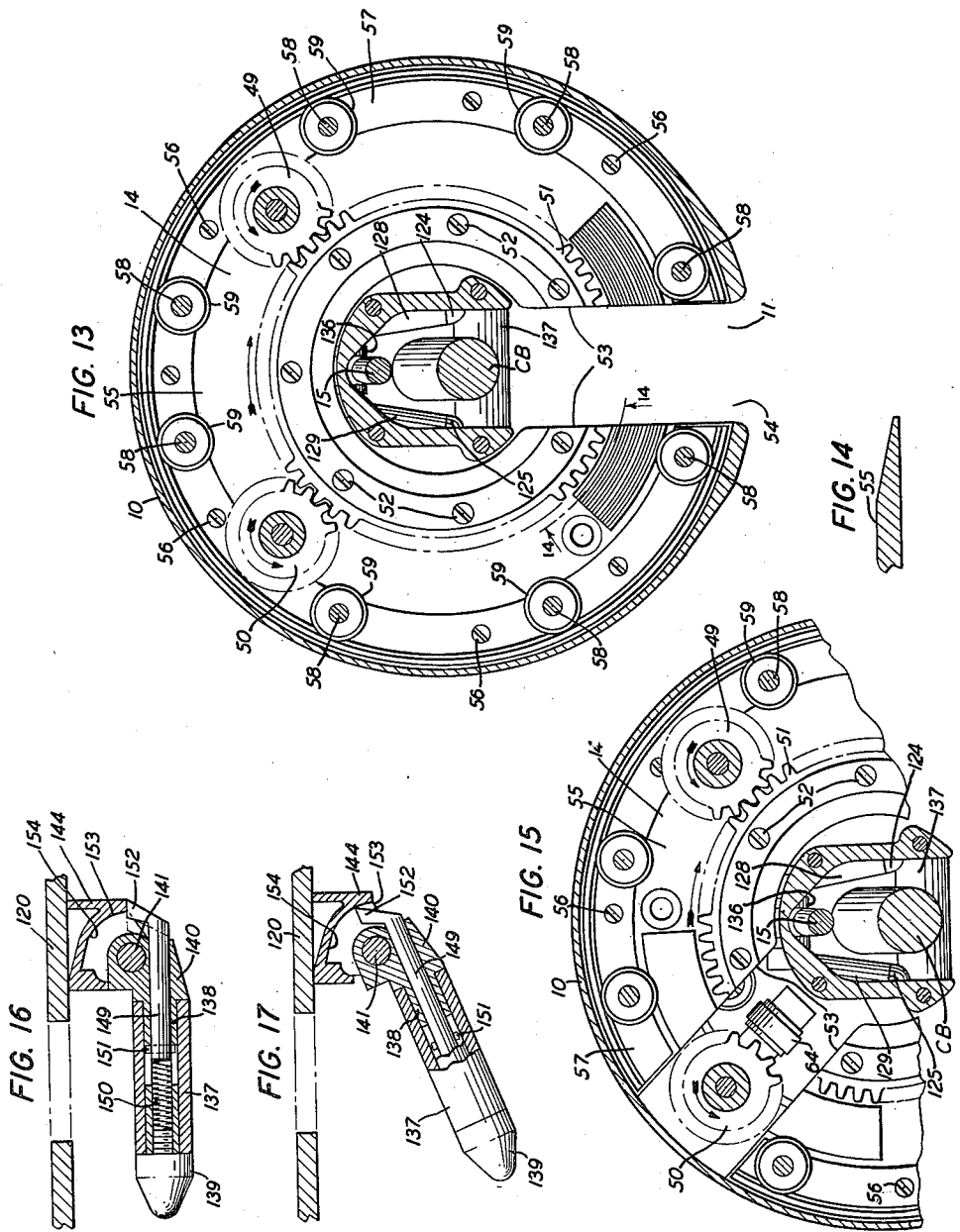

March 6, 1951 J. J. HARLEY 2,544,313
CABLE LASHING MACHINE
Filed Nov. 5, 1948 9 Sheets-Sheet 9
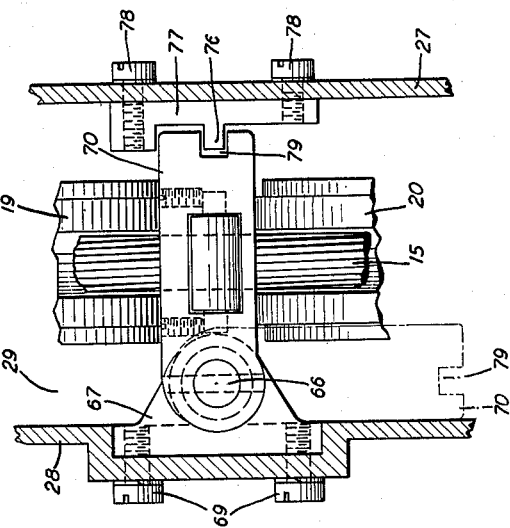
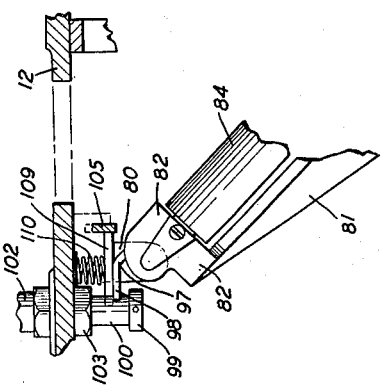
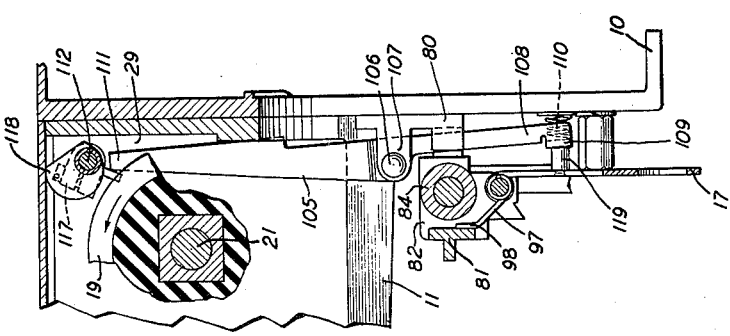
INVENTOR
*J. J. HARLEY*
BY *J. MacDonald*
ATTORNEY Patented Mar. 6, 1951

2,544,313

UNITED STATES PATENT OFFICE 2,544,313

CABLE LASHING MACHINE

Joseph J. Harley, Summit, N. J., assignor to Bell Telephone Laboratories, Incorporated, New York, N. Y., a corporation of New York Application November 5, 1948, Serial No. 58,570

11 Claims. (Cl. 175—376)

This invention relates to the installation of aerial cable and more particularly to a machine for supporting an aerial cable from a messenger or supporting strand.

It is the object of the present invention to provide a machine for securing an aerial cable to a supporting strand in such a manner that the movement between the supporting strand and the cable will be kept at a minimum.

Another object of this invention is the provision of a machine which maintains the supporting strand and cable in close relation and at the same time serving a lashing wire therearound to secure the cable and the supporting strand together.

A further object of the invention is the provision, in a machine for lashing an aerial cable to a supporting strand, of means for preventing backward movement of the machine, when forward tension is released when lashing on an uphill grade.

A still further object of the invention is the provision of a positive action driving mechanism for operating the rotating drum which carries the coils of lashing wire.

The machine of my invention is an improvement over the cable lashing machines shown in Patents 2,231,962 and 2,272,253.

In the preferred form of my invention, I provide a chassis having spaced apart stationary front and rear portions, and a rotatable cylinder or drum positioned therebetween and rotatable thereon. The stationary forward part of the machine houses the mechanism for driving the drum and supports the front end of the machine and the rear end of the machine is provided with means for supporting it and holding the cable to be secured to the supporting strand in juxtaposition as it is lashed to the supporting strand. The rotating drum carries, in suitable compartments, diametrically opposed preformed coils of lashing wire which as the machine advances along the strand is paid out and wrapped around the supporting strand and cable in such a manner that there is little possibility of movement therebetween.

Means have been provided in the driving mechanism, located in the forward part of the machine, for preventing the lashing wire from slacking off due to the machine moving backwards when forward tension on the machine is released.

The features of my invention will be more clearly understood from the following detailed description made with reference to the following drawings of which:

Fig. 2 is a side elevation of the machine shown in Fig. 1 with parts of the forward housing broken away to show the mechanism for driving the rotatable drum;

Fig. 3 is a top plan view of the machine shown in Figs. 1 and 2 with the top plate of the housing removed and a portion of the gear housing for the driving mechanism broken away;

Fig. 4 is a rear end view of the machine shown in Fig. 2 with the drum in its locked position;

Fig. 5 is a front end view of the machine shown in Fig. 2;

Fig. 6 is a longitudinal section view taken on line 6—6 of Fig. 3;

Fig. 7 is a cross-sectional view taken on line 7—7 of Fig. 3;

Fig. 8 is a cross-sectional view taken on line 8—8 of Fig. 2;

Fig. 9 is a fragmentary view partly in section of the means for securing the cover to the housing on the forward part of the machine;

Fig. 10 is a fragmentary view partly in sections taken on line 10—10 of Fig. 5 and shows the front cable guide roller in its locked position;

Fig. 11 is a fragmentary view similar to Fig. 10 with the front cable guide in its opened position;

Fig. 12 is a fragmentary view, partly in section, of the locking pin for preventing the drum from rotating when the front cable guide roller is in its opened position as shown in Fig. 11;

Fig. 13 is a cross-sectional view of the machine of this invention taken on line 13—13 of Fig. 6;

Fig. 14 is a fragmentary view, in cross-section, taken on line 14—14 of Fig. 13;

Fig. 15 is a fragmentary cross-sectional view similar to Fig. 13, but with the drum rotated approximately 120 degrees;

Fig. 16 is a fragmentary view partly in sections of the rear guide roller in its closed position;

Fig. 17 is a view similar to Fig. 16 but shows the rear guide roller in its opened position;

Fig. 18 is a fragmentary cross-sectional view taken on line 18—18 of Fig. 6;

Fig. 19 is a fragmentary top plan view of the latch for maintaining the strand in contact with the operating roller;

Fig. 20 is a fragmentary view, partly in section, of the brake mechanism for preventing the machine from sliding backward on the strand, taken on line 20—20 of Fig. 8;

Fig. 21 is a fragmentary view, partly in section, of the front cable guide showing the spring for tensioning the guide; and Fig. 22 is a fragmentary view partly in sections taken on line 22—22 of Fig. 8.

Figure 1:
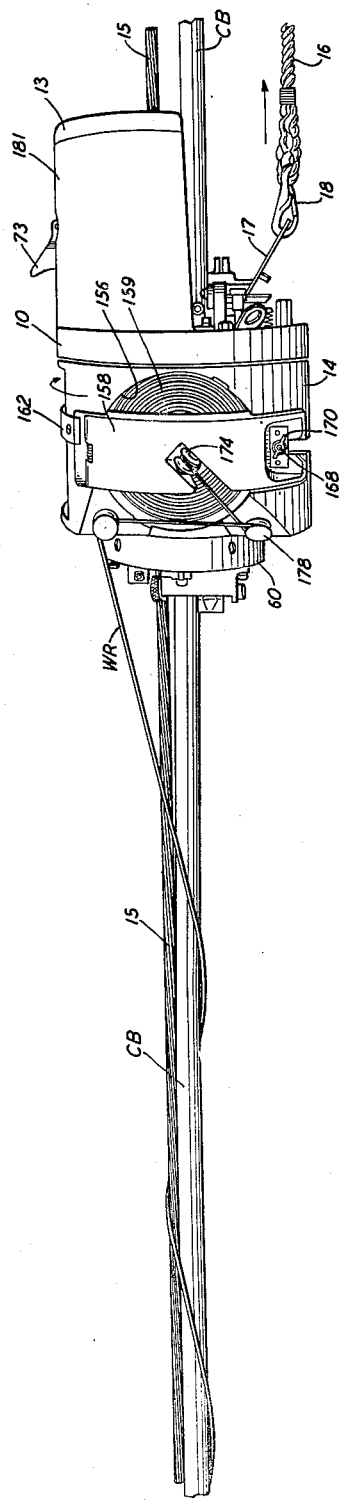
Fig. 1 is a view in perspective of the machine of my invention positioned on a fragment of strand with a cable in the process of being lashed thereto.

As shown in the drawings heretofore referred to, the cable lashing machine of this invention comprises a chassis or frame 10 having a longitudinal extending passageway 11 therethrough, the front end 12 of the chassis 10 has mounted thereon an extended frame portion 13, on which there is mounted the mechanism for driving the drum 14 which is mounted on the chassis 10 to the rear of the frame 13, when the machine is pulled or towed along the strand 15 by means of the hand line 16 which is secured to the cable guide plate 17 by means of the attachments 18.

As shown in Figs. 2, 3 and 6 the front end housing 12 has mounted thereon an extending frame portion 13 which with the chassis 10 forms the stationary part of the machine and contains the mechanism for driving the drum 14.

As shown in Figs. 2, 3 and 6 the driving mechanism comprises a pair of V-groove driving pulleys 19 and 20 preferably made from a tough resilient material such as tire tread rubber. These pulleys are axially mounted on the shafts 21 and 22 which are journaled in suitable bearings 23, 24, 25 and 26 in the wall sections 27 and 28. The wall sections 27 and 28 are spaced apart to form a central compartment 29 for the pulleys 19 and 20 and provide on each side thereof the compartments 30 and 31.

Located in compartment 30 and mounted on the end of the pulley shaft 22, is the gear 32 which is in constant mesh with the idler gear 33 mounted on the shaft 34 journaled in the bearing 35 in the wall section 27 and the web member 36. Also in constant mesh with the idler gear 33 is the gear 37 which is mounted adjacent the end of the pulley shaft 21. Mounted on each end of the pulley shaft 21 are the bevel gears 38 and 39 which are in mesh with the bevel pinions 40 and 41 which are mounted on the shafts 42 and 43. The bevel pinion 40, which is mounted on the shaft 42, is located in compartment 30, one end of the shaft being journaled in the bearing 44 in the web 36 and the other end journaled in the bearing 45 in the frame 10. In a similar manner the bevel pinion gear 41 is mounted on the shaft 43 in compartment 31, one end of which is journaled in the bearing 46 of the web 47 and the other in the bearing 48 of the frame 10.

Located on each end of the shafts 42 and 43, which extend into the housing 12, are the pinion gears 49 and 50 which are in mesh with the segmental ring gear 51 which is secured to the drum 14 by means of the bolts 52 and is provided with a radial slot 53 which is substantially the same width as the passageway 11 in the drum member 14 and the opening 54 in the chassis 10 and housing 12. These openings are provided to permit the machine of this invention to be placed astride the strand 15 and the cable CB as shown in the various figures.

As shown in Figs. 3, 6, 13 and 15 and more in detail in Figs. 13 and 15, there is secured on the front face 55 of the drum 14, adjacent the outer periphery thereof by means of the bolts 56, a segmental flange or track member 57, this like the ring gear 51 and the face 55, has a portion cut away so that the opening thereof is in alignment with the opening 54 of the drum 14 and the passageway 11 in the chassis 10.

Mounted in the housing 12 in circumferential relation with respect to the ring gear 51, and rotatably supported on the wall thereof by means of the axles 58 are the guide rollers 59. These guide rollers are in engagement with the track member 57 and serve as the front end bearing for the drum 14.

The rear end of the drum 14 as shown in Figs. 6 and 18 is rotatably supported in the rear end housing 16 of the chassis or frame 10, by means of suitable rollers axially mounted on the inner wall of the housing. As shown in Fig. 18, two sets of rollers are provided, one set 61 is mounted in axial relation with respect to the drum 14 on suitable supports 62 and in contact with the segmental track 63. Another set of rollers 64 is mounted radially on supports 65 with their axes at right angles with respect to the axis of the rollers 62 and serve as an end or thrust bearing for the drum 14 by engagement with the outer end thereof. Thus we have the drum 14 rotatably mounted on the rollers 61 and 64 in the rear end housing 60 and on the rollers 59 in the front end housing 12 and rotatably driven by the power transmitted by the frictional engagement of the V-pulleys 19 and 20 with the stand 15 thus driving the gears 32 and 37 and the idler 33 which in turn transmits power to the bevel gears 38 and 39 which drive the pinions 40 and 41 and through the shafts 42 and 43 drive the pinions 49 and 50 which are in engagement with the ring gear 51 mounted on the drum 14.

The pinion gears 49 and 50 are so located with respect to the slot 53 in the ring gear 51 that the power transmitted to the drum 14 through the ring gear and its associated gears is constant as long as the V-pulleys 19 and 20 are in engagement with the strand and the machine is being towed along the strand, since at no time is the ring gear 51 out of engagement with one or the other of the pinion gears 49 and 50.

As shown in Figs. 2, 3, 6, 8, 22 and 27 and more in detail in Figs. 6 and 22, means are provided for forcing the strand 15 up into intimate engagement with the V-pulleys 19 and 20. The means as shown comprises a vertical shaft member 66 rotatably mounted in the bracket 67 which is secured in the recessed portion 68 of the central compartment 29, by means of the bolts 69 which pass through the wall section 28. The lower end of the shaft 66, as shown in Fig. 6, is provided with an extending arm 70 which extends at right angles with respect to the shaft 66 and has rotatably mounted thereon a roller member 71 which is adapted to engage the strand 15, as shown by the full lines in Figs. 3, 6 and 8 when the shaft 66 is moved upwardly against the tension of the springs 72 and 72¹ by means of the lever arm 73 as shown in Fig. 2 which is hingeably mounted in the upper end of the slot 66 and is provided with a cam portion 74 which engages the washer 75 when the arm 70 is rotated approximately 90 degrees from the open position which is shown in full lines in Fig. 19 to the mid-position shown in dot and dash lines in Fig. 19 and the lever arm 70 is moved to the position shown in Figs. 2, 3, 8 and 22. In order that the arm 73 will be maintained in its operative position as shown in Figs. 3, 6 and 8, it is locked against movement when the shaft 66 is raised and rotated as heretofore explained. This causes a boss 76 on the plate 77 which is secured to the wall section 27 by means of the bolt 78, to engage the slot 79 in the end of the arm 70 as shown in detail in Fig. 22. As shown, the spring 72 exerts upward tension on the washer 75 and shaft 66 when the roller 71 is in engagement with the strand 15.

When the machine is to be removed from the strand 15, the lever arm 73, as shown in Fig. 2 is thrown over to the position shown by the dot and dash lines, see also Fig. 19, thus permitting the shaft 66 to move downwardly and disengage the arm 70 from the boss 76 against the tension of spring 72 and move the roller 71 away from the strand 15 as shown in dot and dash lines in Fig. 6. Then by rotating the arm 70 as shown by the full lines in Fig. 19, the arm 70 and roller 71 are swung out of the way.

As shown in Figs. 1, 2, 5, 6, 10 and 11 and more in detail in Figs. 10 and 11, means are provided on the front face of the housing 12 beneath the pulleys 19 and 20, for supporting the cable CB and guiding it into position in the passageway 11.

Mounted on the front face of the housing 12 by means of the bracket 80 is the hinge member or arm 81 which has rotatably mounted, in the bifurcated portion thereof, in suitable bearings located in the end portions 82 and 83 thereof, a roller 84. The hinged arm 81 with its roller 84 may be readily swung out of its locked position across the passageway 11 as shown in Fig. 10 and into the position as shown in Fig. 11 to permit the machine to be placed over the cable CB and strand 15, by pressing inwardly on the end 85 of the latch 86 which is pivotally mounted on the bolt 87 located in the slot 88 in the extending portion 89 on the end 83 of the arm 81. This action against the tension of the spring 90 and its associated pin 91, which maintains the latch in its locked position, causes the notched end 92 to become disengaged from the latch plate 93 located in the aperture 94 of housing 12 and permits the arm 81 and its associated roller 84 to be swung outwardly over the guide member 95 which is positioned in the rear of the slot 88 as shown in Fig. 11. A stop pin 96 in the slot 88 limits the movement of the latch 86 when it is in the opened position as shown in Fig. 11.

Located on the end portion 82 of the arm 81 is an extending bifurcated plate member 97. This member is so shaped that the extending edge portion 98—98, as shown in Fig. 11, engages the underside of the head 99 of the pin 100 and holds it in its extended position against the tension of the spring 101 as shown.

The pin 100 is slidably mounted in a sleeve member 102 secured in the housing 12 by means of a nut 103 and is in alignment with an aperture 104 located in the front face 55 of the drum 14 as shown in detail in Fig. 12. When the arm 81 is in its operating or closed position as shown in Figs. 1, 2, 5, 6, 8 and 10 and more in detail in Fig. 10, the pin 100 will be held out of engagement with the aperture 104 in the face 55 of the drum 14 and will permit the ready rotation thereof. However, when the arm 81 is swung outwardly as shown in Fig. 11, the pin 100 under the influence of the spring 101 will bear against the face 55 and will enter the aperture 104 when the passageway 11 is in alignment with the opening 54 thereby preventing the drum 14 from rotating when the machine is being positioned on or removed from the strand and cable.

As shown in Figs. 5, 8 and 20 and more in detail in Fig. 20, there is also associated with the extending plate member 97 on the arm 81, a lever or rocker arm 105 which is pivotally mounted at 106 on the upper portion 107 of the bracket 80. The lower end 108 of the arm 105 has a lug 109 extending at right angles therefrom and in engagement with the underside of the member 97 which has a cam surface thereon. The lug 109 is maintained in engagement with the member 97 by means of a spring 110 which is confined between a seat in the housing 12 and the inner side of the lug 109.

The upper end 111 of the arm 105 extends into the central compartment 29 and is normally positioned in alignment with the shaft 112 which is rotatably mounted in the bearings 113 and 114 in the wall sections 27 and 28.

As shown in Fig. 3, there is secured to the shaft 112 in juxtaposition with respect to the rims of the pulleys 19 and 20, a pair of substantially wedge-shaped dogs or shoes 115 and 116, there is also secured to the shaft 112 a dog member 117 which is positioned directly in the path of the upper end 111 of the lever arm 105, and as shown in Fig. 20 cooperates therewith to maintain the shoes 115 and 116 out of contact with the rim of the pulleys 19 and 20 against the tension of the spring 118 which forces the shoes 115 and 116 against the rims of the pulley 19 to prevent the rotation and to prevent backward movement of the machine when forward tension is released thereby maintaining sufficient back tension on the machine to hold the lashing wire WR taut.

The application and release of the braking mechanism is substantially automatic and operates in the following manner. When the arm 81, with its roller 84 is in its normal or operating position as shown in Fig. 10, the plate 97 on the arm 81 is out of engagement with the lug 109 thus permitting the spring 110 to exert sufficient pressure on the arm 105, through the lug 109 to cause the upper end 111 of the arm 105 to be out of engagement with the dog 117. The shoes 115 and 116 are held lightly against the rims of the pulley 19 by the tension of spring 118 as shown in Fig. 20 thereby permitting the clockwise rotation of the pulleys 19 and 20 but preventing counter-clockwise rotation of the pulleys 19 and 20 and the consequent rear movement of the machine. However, when it is desired to remove the machine from the strands or swing the arm 81 open as shown in Figs. 11 and 12, the plate 97 engages the lug 109 on the arm 105, presses it downward against the tension of the spring 110 causes the upper end 111 of the arm 105 to engage the dog 117 rotate the shaft 112 and disengages the shoes 115 and 116 from the rims of the pulley 19 under the influence of the spring 118, thereby permitting pulley 19 to rotate.

Since in some instances it may be desirable to release the brake when the machine is stationary and without swinging open the arm 81 to its non-operating position, means are provided in the form of a pin 119 mounted on the hinge member 17, which when pulled toward the rear of the machine causes the pin to engage the lug 109 and operate the shoes 115 and 116 in a manner as heretofore disclosed with respect to the swinging opening of the arm 81 as shown in Fig. 11.

Located on the rear end housing 60 of the chassis 10, which contains the rollers for supporting the rear end of the drum 14, is means for forcing the cable CB upwardly into engagement with the strand 15 and maintaining it in juxtaposition while the lashing wire WR is being served therearound as shown in Fig. 1. A guide pulley 136 is provided on the inside wall of the rear housing 60 for supporting the machine on the strand 15 and is in alignment with the groove of the V-pulleys 19 and 20.

As shown in Figs. 2, 3 and 4 and more particularly with respect to Fig. 4, cable positioning means or guides are mounted on the rear face 120 of the rear housing 60 and are adjustable to accommodate various sizes of cable. Secured to the face 120 above the passageway 11, by means of the bolts 121 and 122 is a plate member 123 which has mounted thereon, in spaced relation, a pair of pivoted, downwardly projecting arms 124 and 125. These arms are slotted at their upper ends and are rotatably and slidably mounted on the studs 126 and 127 and have located on the lower ends thereof roller members 128 and 129. Secured to the upper portion of the arms 124 and 125 are the threaded bosses 130 and 131, the boss 130 having a left-hand internal thread and boss 131 having a right-hand internal thread. Threadedly mounted in the bosses 130 and 131 is a shaft 132, the ends of which are journaled in lugs or ears 133 and 134 which are at right angles thereto and are formed up from the plate 123. A knurled finger wheel 135, secured to one end of the shaft 132 provides means for manually rotating the shaft, which, when operated in a clockwise direction causes the arms 124 and 125 to travel towards each other and narrow the opening therebetween and when operated in a counter-clockwise direction causes the arms 124 and 125 to travel away from each other and widen the opening, thereby providing adjustable means for guiding the cable CB.

The cable lifting means as shown in Figs. 2, 3, 4, 16 and 17 and with particular reference to Figs. 2 and 3 comprises the cable lifter rolled 137 mounted on a hollow outboard shaft 138 which is provided at its free end with a suitable collar or stop 139. The inner end of the shaft 138 is integral with an internally threaded boss 140 which is in threaded engagement with the threaded shaft 141 journaled in suitable bearings in the projecting lugs 142 and 143 of the bracket 144 which is secured to the face 120 of the housing 60 by means of the bolts 145, 146 and 147. A knurled finger wheel 148, secured to the upper end of the shaft 141, when manually operated either clockwise or counter-clockwise, causes the boss 140 to travel upwardly or downwardly on the shaft 141 and carry with it the roller 137, thereby providing the adjustment necessary to accommodate various sizes of cable.

In order to lock the roller 137 in its operative position, i. e., across the passageway 11 as shown in Figs. 3, 4, 6, 7, 16 and 18, a latch member or bolt 149 is slidably mounted in the hollow shaft 138 and is held extended, as shown in Fig. 16, by means of the spring 150 which is confined between the collar 139 on the shaft 138 and the inner end of the latch 149. A pin 161 located on the inner end of the latch 149 limits the amount of outward movement of the latch member.

When it is desired to open the guide roller 137 to permit the machine to be placed over the strand 15 and cable CB, the end 152 of the latch 149 is pushed inwardly against the tension of the spring 150 until the end thereof clears the inner edge 153 of the bracket 144 which is provided with a curved recess portion 154. The roller 37 may then be swung open as shown in Fig. 17, with the end 152 of the latch 149 riding on the curved surface of the recess 154. Due to the pressure of the spring 150 on the latch 149, the end 152 is in frictional engagement with the curved recess 154 and thereby provides friction means for holding the guide roller 136 in its opened position but permitting it to be readily swung to its closed or operative position when desired, as the end 152 rides over the inner surface of the recess 154 as shown in Figs. 16 and 17.

The drum 14 as previously described is rotatably supported at its forward end by means of the guide rollers 59 and the track 57 and at its rear end by means of the rollers 61, track 63 and rollers 64 and is adapted to be rotated in the manner and by the mechanism heretofore described.

The drum 14 as shown in Figs. 1, 2, 3, 4, 6 and 7 is provided with diametrically opposite compartments 155 and 156 in which there is confined by means of the gates 157 and 158 the coils of lashing wire 159 and 160. The gates 157 and 158 are hingeably mounted adjacent the top compartment 161, which with the cross-member 162 provides a suitable means for gripping the machine for carrying it or positioning it on the strand. Suitable springs 163 and 164 on the pins 165 and 166 of the gates 157 and 158, exert sufficient pressure thereon to maintain the gates open when the coils of lashing wire 159 and 160 are being positioned therein.

Locking means comprising the hinged bolts 167 and 168 and threaded spring nuts 169 and 170 securely hold the gates 157 and 158 in their closed position and confine the coils 159 and 160 between the protuberances 171 and 172 on the gates and the inner walls of the compartment 155 and 156. Located in the gates 157 and 158 are guide rollers 173 and 174. These rollers are located in slots and are positioned over the protuberances 171 and 172 which are provided with centrally disposed apertures 175 and 176.

In order to facilitate the feeding of the lashing wire WR from the coils 159 and 160 and to reduce the friction as much as possible, the axis of the rollers 173 and 174 are at an angle and are in alignment with the guide rollers 177 and 178 which are rotatably mounted at the rear of the drum 174 adjacent the end thereof. As shown, the lashing wire WR, after leaving the coil 160 passes through the aperture 176 over the roller 174, one turn around the rollers 178 and 180 and thence around the strand 15 and cable CB as shown in Fig. 1.

A suitable cover 181 is provided on the forward part of the machine, over the driving mechanism, and is held in place by means of the bolts 182 as shown in Fig. 9.

In the application of the lashing machine of this invention to the practice of securing aerial cable to a supporting strand by means of a wire lashed therearound, in place of the usual cable rings, the following sequence of operation is followed.

The coils of lashing wire 159 and 160 are placed in their respective compartments 155 and 156. One coil, that is, the reserve coil, is left intact after it has been placed in position but the wire on the other coil 160 is inserted through the aperture 176 over the pulleys or rollers 174, 178 and 180 and is pulled outwardly a sufficient amount to provide an adequate length of wire for securing it to the cable CB and strand 15 prior to the operation of the lashing machine. After the coils of lashing wire 159 and 160 have positioned in the drum 14 as heretofore described, the tension roller 71 mounted on the arm 70 and the cable guide roller 84 mounted on the arm 81 are swung open from their normal or operating position across the passageway 11. The next step is to swing the rear roller 137 out of its position across the passageway 11 and adjust the arms 124 and 125 of the strand guide to the proper size of cable CB which the machine is to be operated on. The machine is then placed over the strand and cable with the strand 15 positioned in the grooves of the pulleys 19 and 20 and in the groove of the rear pulley or roller 136. The strand tensioning roller 71 is then swung back into its position across the passageway 11 and moves upwardly against a strand 15 as heretofore described and as shown in Figs. 8 and 22 to hold the strand into intimate engagement with the grooves of the pulleys 19 and 20. The guide roller 84 is swung back into its normal operating position as shown in Figs. 5, 6 and 10 and locks by means of the latch 86 thereby releasing the pin 100 to permit the free rotation of the drum 14 and to also release the brake shoes 115 and 116 from the pulleys 19 and 20.

The next step is to secure the free end of the lashing wire WR to the strand 15 after which the lashing of the cable CB to the strand 15 may proceed by towing the machine along the strand by means of the tow rope 16 as shown in Fig. 1.

The rear roller 137 is then swung closed and moves up in contact with the cable CB as shown in Fig. 4.

In some instances, when pulling to the side of the supporting strand 15, it may be desirable to secure the tow rope to the rings 183—183 located on the front face of the shaft 10.

While there has been shown herein and described the improved embodiment of my invention, it will be understood that various modifications and changes may be made therein without departing from the spirit of the invention and I am only limited by the scope of the appended claims.

What is claimed is:

1. A machine for securing a cable to a supporting strand which comprises a chassis having front and rear spaced apart housings, a drum rotatably supported between said housings, said drum and said housings having aligned central bores for the reception of the cable and the supporting strand, said housings and said drum having openings therein communicating with said bores to permit the machine to be placed in operative position on the supporting strand, a pair of preformed coils of lashing wire carried by said drum, on opposite sides thereof, a pair of driving wheels, each mounted on an axis, in the front housing one ahead of the other and in space relation for engaging the same side of the supporting strand and a roller on the opposite side thereof, between said wheels, in engagement with said strand for forcing said strand into engagement with said wheels, said wheels having driving shafts operatively connected thereto, gears on said driving shafts, an idler gear in mesh with said gears, one of said driving shafts having a gear mounted on each end thereof, a pair of driven shafts operably connected to said driving shaft and to said drum to cause the rotation thereof as the driving wheels are operated by the forward movement of the machine to cause the lashing wire carried by said drum to be wrapped around the strand and cable, braking means comprising a cam having an increasing radius, in operative relation with the periphery of one of said driving wheels for preventing rearward movement of said machine and the consequent slacking off of the lashing wire when forward tension is released, and means comprising a trip lever on said machine, operatively connected to said braking means, for remote control thereof.

2. A machine for securing a cable to a supporting strand which comprises a chassis having front and rear spaced apart housings, a drum rotatably supported between said housings, said drum and said housings having aligned central bores for the reception of the cable and the supporting strand, said housings and said drum having openings therein communicating with said bores to permit the machine to be placed in operative position on the supporting strand, a pair of preformed coils of lashing wire carried in oppositely disposed compartments on said drum, a pair of driving wheels, each mounted on an axis, in the front housing one ahead of the other and in space relation for engaging the same side of the supporting strand and a roller on the opposite side thereof, between said wheels, in engagement with said strand for forcing said strand into engagement with said wheels, driving gears operatively connected to said wheels, driven shafts having gears thereon in engagement with said driving gears, gears on said driven shafts in engagement with the gear on said drum to cause the rotation thereof as the driving wheels are operated by the forward movement of the machine to cause the lashing wire carried by said drum to be wrapped around the strand and cable, braking means comprising a cam, having an increasing radius positioned over and in frictional engagement with the periphery of one of said driving wheels for preventing rearward movement of said machine and the consequent slacking off of the lashing wire when the forward tension is released, and a trip lever on said machine operatively connected to said braking means for the remote control thereof.

3. A machine for securing a cable to a supporting strand which comprises a chassis having front and rear spaced apart housings, a drum rotatably supported between said housings, said drum and said housings having aligned central bores for the reception of the cable and the supporting strand, said housings and said drum having openings therein communicating with said bores to permit the machine to be placed in operative position on the supporting strand, preformed coils of lashing wire carried by said drum, on opposite sides thereof, a pair of driving wheels, each mounted on an axis in the front housing one ahead of the other in space relation for engaging the same side of the supporting strand and a roller on the opposite side thereof, between said wheels, in engagement with said strand for forcing said strand into engagement with said wheels, said wheels having driving shafts operatively connected thereto, gears on said driving shafts, an idler gear in mesh with said gears, one of said driving shafts having a gear mounted on each end thereof, a pair of driven shafts operatively connected to said driving shaft and to said drum to cause the rotation thereof as the driving wheels are operated by the forward movement of the machine to cause the lashing wire carried by said drum to be wrapped around the strand and cable, braking means comprising an eccentrically pivoted cam member, having an increasing radius, mounted in contact with the periphery of one of said driving wheels for preventing rearward movement of said machine and the consequent slacking off of the lashing wire when forward tension is released, and a trip lever on said machine operatively connected to said braking means for the remote control thereof.

4. A machine for securing a cable to a supporting strand which comprises a chassis having front and rear spaced apart housings, a drum rotatably supported between said housings, said drum and said housings having aligned central bores for the reception of the cable and the supporting strand, said housings and said drum having openings therein communicating with said bores to permit the machine to be placed in operative position on the supporting strand, a pair of preformed coils of lashing wire carried in oppositely disposed compartments on said drum, a pair of driving wheels, each mounted on an axis, in the front housing one ahead of the other and in space relation, for engaging the same side of the supporting strand and a roller on the opposite side thereof, between said wheels, in engagement with said strand for forcing said strand into engagement with said wheels, driving gears operatively connected to said driving wheels, driven shafts having gears thereon in engagement with said driving gears, gears on said driven shafts in engagement with a gear on said drum to cause the rotation thereof as the driving wheels are operated by the forward movement of the machine to cause the lashing wire carried by said drum to be wrapped around the strand and cable, braking means comprising an eccentrically pivoted cam member, having an increasing radius mounted in contact with the periphery of one of said driving wheels for preventing rearward motion of said machine and the consequent slacking off of the lashing wire when forward tension is released, and a trip lever on said machine operatively connected to said braking means for the remote control thereof.

5. A machine for securing a cable to a supporting strand which comprises a chassis having front and rear spaced apart housings, a drum rotatably supported between said housings, said drum and said housings having aligned central bores for the reception of the cable and the supporting strand, said housings and said drum having openings therein communicating with said bores to permit the machine to be placed in operative position on the supporting strand, a pair of preformed coils of lashing wire carried by said drum on opposite sides thereof, a pair of driving wheels, each mounted on an axis in the front housing, one ahead of the other in space relation for engaging the same side of the supporting strand and a roller on the opposite side thereof, between said wheels, in engagement with said strand for forcing said strand into engagement with said wheels, said wheels having driving shafts operatively connected thereto, gears on said driving shafts, an idler gear in mesh with said gears, one of said driving shafts having a gear mounted on each end thereof, a pair of driven shafts operatively connected to said driving shaft and to said drum to cause the rotation thereof as the driving wheels are operated by the forward movement of the machine to cause the lashing wire carried by said drum to be wrapped around the strand and cable, braking means comprising a cam, having an increasing radius, in frictional contact with the periphery of one of said driving wheels for preventing rearward movement of said machine and the consequent slacking off of the lashing wire when forward tension is released, a trip lever on said machine operatively connected to said braking means for the remote control thereof, and means on said front housing cooperating with said drum for preventing the rotation thereof so that the opening therein is in alignment with the openings in the stationary housings.

6. A machine for securing a cable to a supporting strand which comprises a chassis having front and rear spaced apart housings, a drum rotatably supported between said housings, said drum and said housings having aligned central bores for the reception of the cable and the supporting strand, said housings and said drum having openings therein communicating with said bores to permit the machine to be placed in operative position on the supporting strand, a pair of preformed coils of lashing wire carried in oppositely disposed compartments on said drum, a pair of driving wheels each mounted on an axis in the front housing, one ahead of the other and in space relation for engaging the same side of the supporting strand, and a roller on the opposite side thereof, between said wheels in engagement with said strand for forcing said strand into engagement with said wheels, driving gears operatively connected to said driving wheels, driven shafts having gears thereon in engagement with said driving gears, gears on said driven shafts in engagement with a gear on said drum to cause the rotation thereof as the driving wheels are operated by the forward movement of the machine to cause the lashing wire carried by said drum to be wrapped around the strand and cable, braking means comprising an eccentrically pivoted cam member, having an increasing radius, mounted in contact with the periphery of one of said driving wheels for preventing rearward movement of said machine and the consequent slacking off of the lashing wire when forward tension is released, a trip lever on said machine operatively connected to said braking means for the remote control thereof, and means on said front housing cooperating with said drum for preventing the rotation thereof so that the opening therein is in alignment with the openings in said stationary housings.

7. A machine for securing a cable to a supporting strand which comprises a chassis having front and rear spaced apart housings, a drum rotatably supported between said housings, said drum and said housings having aligned central bores for the reception of the cable and the supporting strand, said housings and said drum having openings therein communicating with said bores to permit the machine to be placed in operative position on the supporting strand, a pair of preformed coils of lashing wire carried by said drum on opposite sides thereof, a pair of driving wheels, each mounted on an axis in the front housing one ahead of the other and in space relation for engaging the same side of the supporting strand, and a roller on the opposite side thereof, between said wheels, in engagement with said strand for forcing said strand into engagement with said wheels, said wheels having driving shafts operatively connected thereto, gears on said driving shafts, an idler gear in mesh with said gears, one of said driving shafts having a gear mounted on each end thereof, a pair of driven shafts operatively connected to said driving shaft and to said drum to cause the rotation thereof as the driving wheels are operated by the forward movement of the machine to cause the lashing wire carried by said drum to be wrapped around the strand and cable, braking means comprising a cam, having an increasing radius, in frictional engagement with the periphery of one of said driving wheels for preventing rearward movement of said machine and the consequent slacking off of the lashing wire when forward tension is released, a trip lever on said machine operatively connected to said braking means for the remote control thereof, and means associated with said trip lever for maintaining said brake normally in engagement with said driving wheel.

8. A machine for securing a cable to a supporting strand which comprises a chassis having front and rear spaced apart housings, a drum rotatably supported between said housings, said drum and said housings having aligned central bores for the reception of the cable and the supporting strand, said housings and said drum having openings therein communicating with said bores to permit the machine to be placed in operative position on the supporting strand, a pair of preformed coils of lashing wire carried in compartments on opposite sides of said drum, a pair of driving wheels each mounted on an axis in the front housing one ahead of the other in space relation for engaging the same side of the supporting strand, and a roller on the opposite side thereof, between said wheels for forcing said strand into engagement with said wheels, driving gears operatively connected to said driving wheels, driven shafts having gears thereon in engagement with said driving gears, gears on said driven shafts in engagement with the gear on said drum to cause the rotation thereof as the driving wheels are operated by the forward movement of the machine to cause the lashing wire carried by said drum to be wrapped around the strand and cable, braking means comprising a cam, having an increasing radius, in frictional engagement with the periphery of one of said driving wheels for preventing rearward movement of said machine and the consequent slacking off of the lashing wire when forward tension is released, a trip lever on said machine operatively connected to said braking means for the remote control thereof, said roller in the front housing mounted in adjustable relation with respect to said wheels and said strand.

9. A machine for securing a cable to a supporting strand which comprises a chassis having front and rear spaced apart housings, a drum rotatably supported between said housings, said drum and said housings having aligned central bores for the reception of the cable and the supporting strand, said housings and said drum having openings therein communicating with said bores to permit the machine to be placed in operative position on the supporting strand, a pair of preformed coils of lashing wire carried in compartments on opposite sides of said drum, a pair of driving wheels each mounted on an axis in the front housing one ahead of the other and in space relation for engaging the said side of the supporting strand and a roller on the opposite side thereof, between said wheels, in engagement with said strand for forcing said strand into engagement with said wheels, driving gears operatively connected to said driving wheels, driven shafts having gears thereon in engagement with said driving gears, gears on said driven shafts in engagement with a gear on said drum to cause the rotation thereof as the driving wheels are operated by the forward movement of the machine to cause the lashing wire carried by said drum to be wrapped around the strand and cable, braking means comprising an eccentrically pivoted cam, having an increasing radius, mounted in contact with the periphery of one of said driving wheels for preventing rearward movement of said machine and the consequent slacking off of the lashing wire when forward tension is released, a trip lever on said machine operatively connected to said braking means for the remote control thereof, said roller in said housing mounted in adjustable relation with respect to said wheels and said strand.

10. A machine for securing a cable to a supporting strand which comprises a chassis having front and rear spaced apart housings, a drum rotatably supported between said housings, said drum and said housings having aligned central bores for the reception of the cable and the supporting strand, said housings and said drum having openings therein communicating with said bores to permit the machine to be placed in operative position on the supporting strand, a pair of preformed coils of lashing wire carried by said drum on opposite sides thereof, a pair of driving wheels each mounted on an axis in the front housing one ahead of the other and in space relation for engaging the same side of the supporting strand, and a roller on the opposite side thereof between said wheels in engagement with said strand for forcing said strand into engagement with said wheel, said wheels having driving shafts operatively connected thereto, gears on said driving shafts in engagement with said drum to cause the rotation thereof as the driving wheels are operated by the forward movement of the machine to cause the lashing wire carried by said drum to be wrapped around the strand and cable, braking means comprising an eccentrically pivoted cam member, having an increasing radius, mounted in contact with the periphery of one of said driving wheels for preventing rearward movement of said machine and the consequent slacking off of the lashing wire when forward tension is released, a trip lever on said machine operatively connected to said braking means for the remote control thereof, means on said front housing cooperating with said drum for preventing the rotation thereof so that the opening therein is in alignment with the opening in said stationary housing.

11. A machine for securing a cable to a supporting strand which comprises a chassis having front and rear spaced housings, a drum rotatably supported between said housings, said drum and said housings having aligned central bores for the reception of the cable and the supporting strand, said housings and said drum having openings therein communicating with said bores to permit the machine to be placed in operative position on the supporting strand, a coil of lashing wire carried on said drum, a pair of driving wheels each mounted on an axis in the front housing one ahead of the other and in spaced relation for engaging the same side of the supporting strand, and a roller on the opposite side of said strand located between said wheels, in engagement with said strand for forcing said strand into engagement with said wheels, said wheels having driving shafts operatively connected thereto, gears on said driving shafts, an idler gear in mesh with said gears, one of said driving shafts having a gear mounted on each end thereof, a pair of driven shafts operatively connected to said driving shafts and to said drum to cause the rotation of said drum as the driving wheels are operated by the forward movement of the machine to cause the lashing wire carried by said drum to be wrapped around the strand and cable.

JOSEPH J. HARLEY.

REFERENCES CITED

The following references are of record in the file of this patent:

UNITED STATES PATENTS

| Number | Name | Date |
|---|---|---|
| 2,231,962 | St. John | Feb. 18, 1941 |
| 2,272,253 | St. John | Feb. 10, 1942 |
| 2,295,749 | Neale | Sept. 15, 1942 |
| 2,300,035 | Neale | Oct. 27, 1942 |
| 2,402,172 | Macy | June 18, 1946 |
| 2,479,635 | Neale | Aug. 23, 1949 |